(12) United States Patent
Ozawa et al.

(10) Patent No.: US 6,865,900 B2
(45) Date of Patent: Mar. 15, 2005

(54) TEMPERATURE CONTROL METHOD FOR REFRIGERATOR

(75) Inventors: Shigeru Ozawa, Nagano (JP); Tetsuhiko Hara, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/606,281

(22) Filed: Jun. 24, 2003

(65) Prior Publication Data

US 2004/0025534 A1 Feb. 12, 2004

(30) Foreign Application Priority Data

Jul. 3, 2002 (JP) ........................................ 2002-195190

(51) Int. Cl.[7] ............................................... F25B 5/02
(52) U.S. Cl. .......................................... 62/199; 62/442
(58) Field of Search ........................... 62/199, 200, 525, 62/527, 528, 442, 504

(56) References Cited

U.S. PATENT DOCUMENTS

| | | | | | |
|---|---|---|---|---|---|
| 1,523,112 A | * | 1/1925 | Fitz Gerald | .................. | 62/199 |
| 2,133,949 A | * | 10/1938 | Buchanan | ..................... | 62/199 |
| 2,576,663 A | * | 11/1951 | Atchison | ..................... | 62/199 |
| 5,465,591 A | * | 11/1995 | Cur et al. | ..................... | 62/439 |
| 6,067,815 A | * | 5/2000 | James | ......................... | 62/438 |
| 6,370,895 B1 | * | 4/2002 | Sakuma et al. | ............... | 62/199 |

* cited by examiner

*Primary Examiner*—Harry B. Tanner
(74) *Attorney, Agent, or Firm*—Hogan & Hartson, LLP

(57) ABSTRACT

A temperature control method for a refrigerator includes providing a valve device, in which an inflow port where a refrigerant flows into, at least two outflow ports having a first outflow port and a second outflow port where the refrigerant flows out, and a valve element for performing opening/closing of the outflow ports are positioned in a sealed space. The method also includes providing a valve element drive device for driving the valve element. The method further includes controlling the valve element drive device, at the time a power source of the refrigerator is turned on, to reciprocate between a first mode as an OPEN-CLOSE mode and a second mode on a CLOSE-OPEN mode until a temperature in a first chamber where the refrigerant is supplied through the first outflow port, and a temperature in a second chamber where the refrigerant is supplied through the second outflow port, are lowered to reach to a prescribed temperature.

22 Claims, 5 Drawing Sheets

[FIG.1]
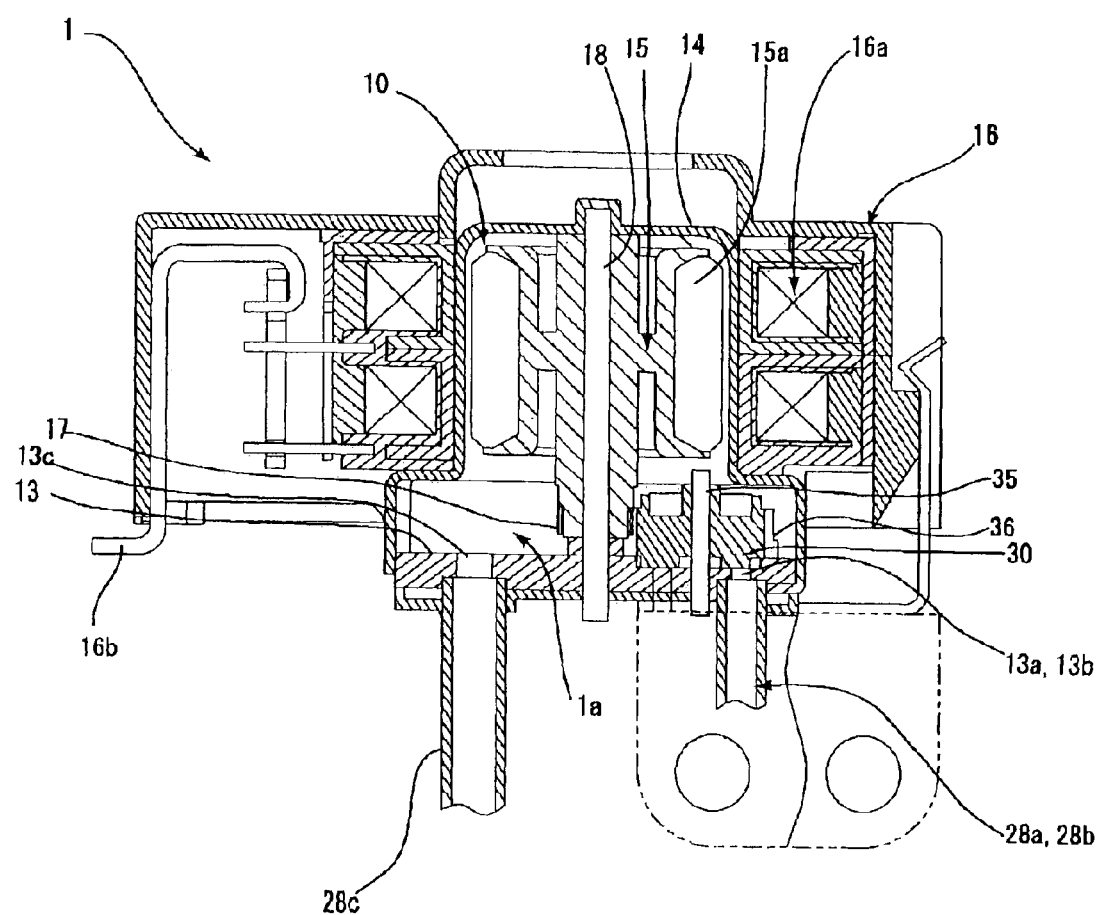

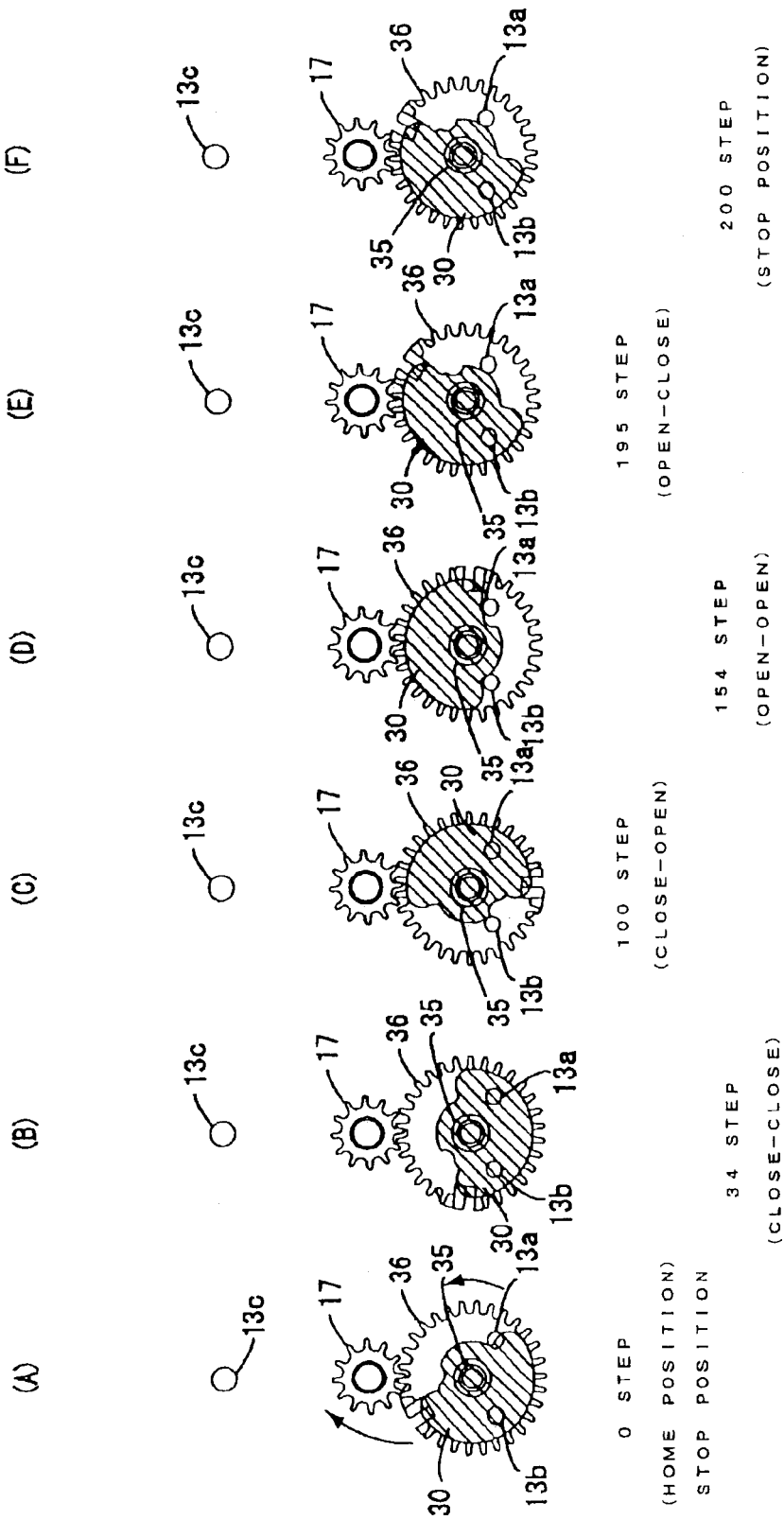
[FIG.2]

[FIG.3]
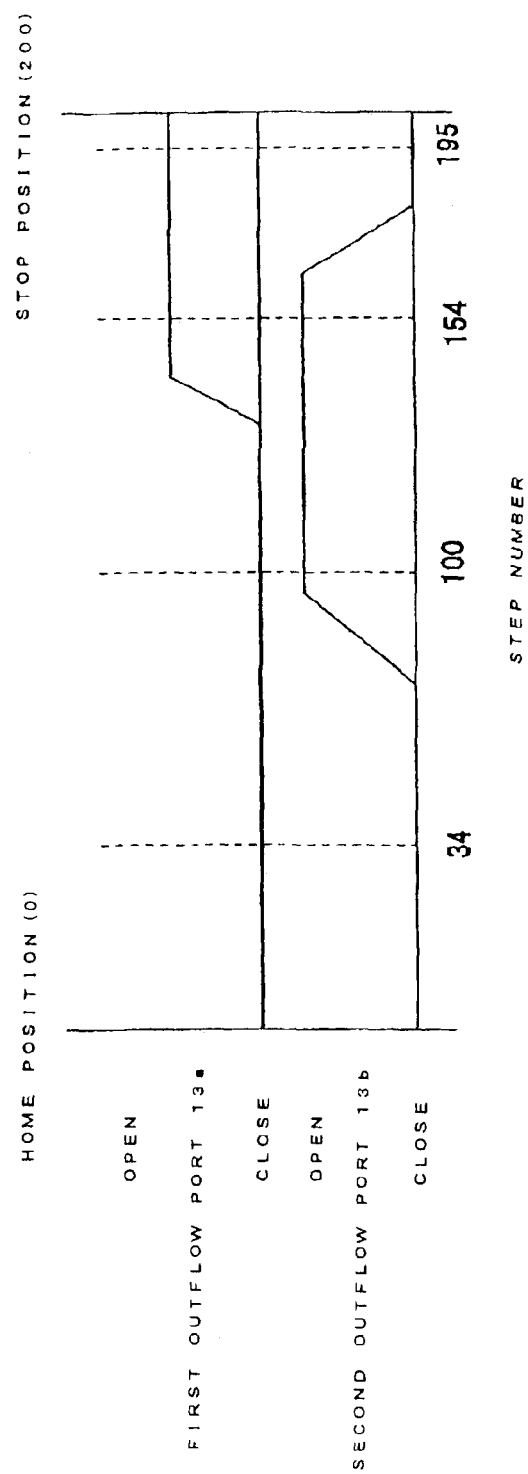

[FIG.4]
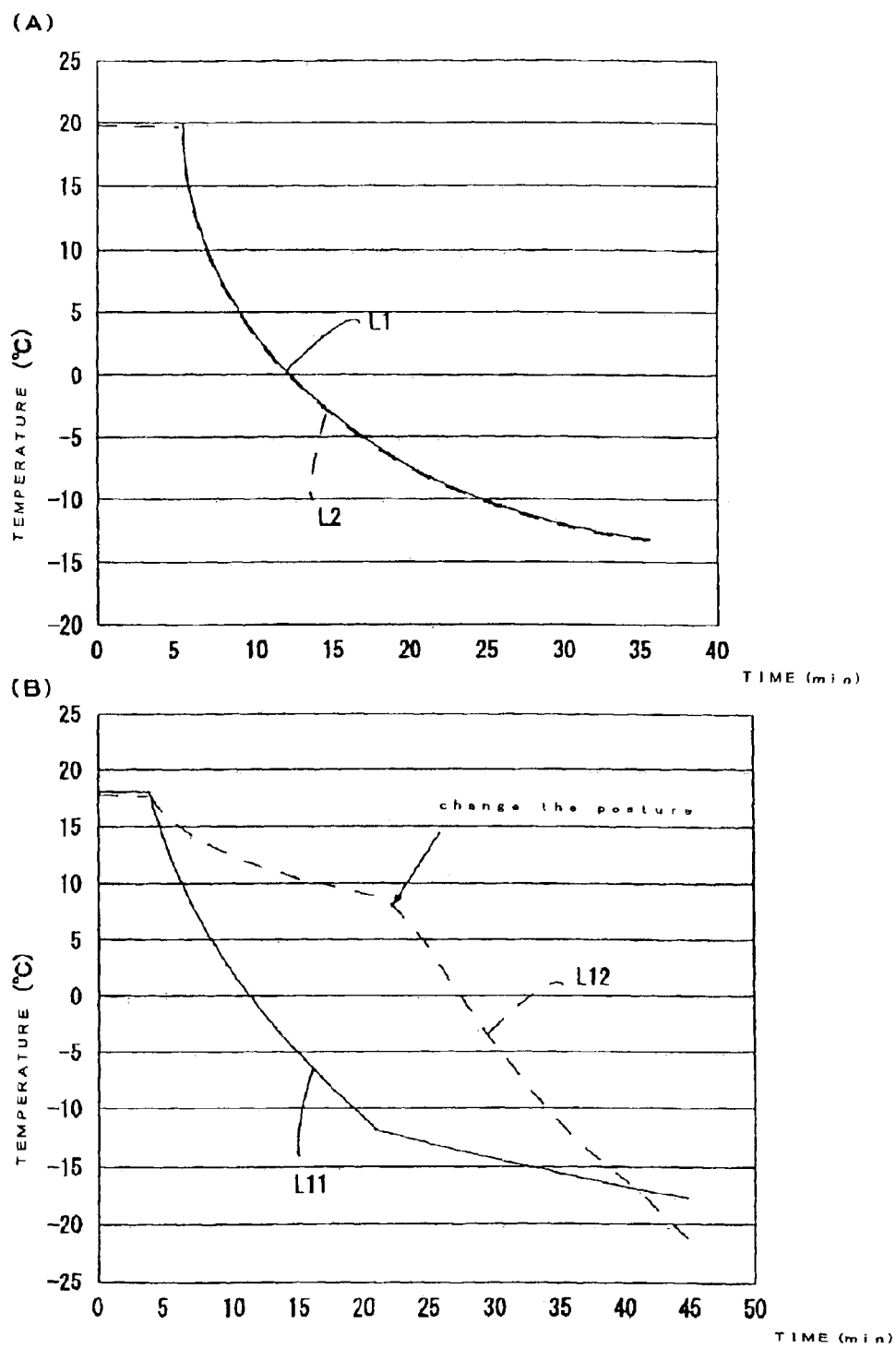

[FIG.5]
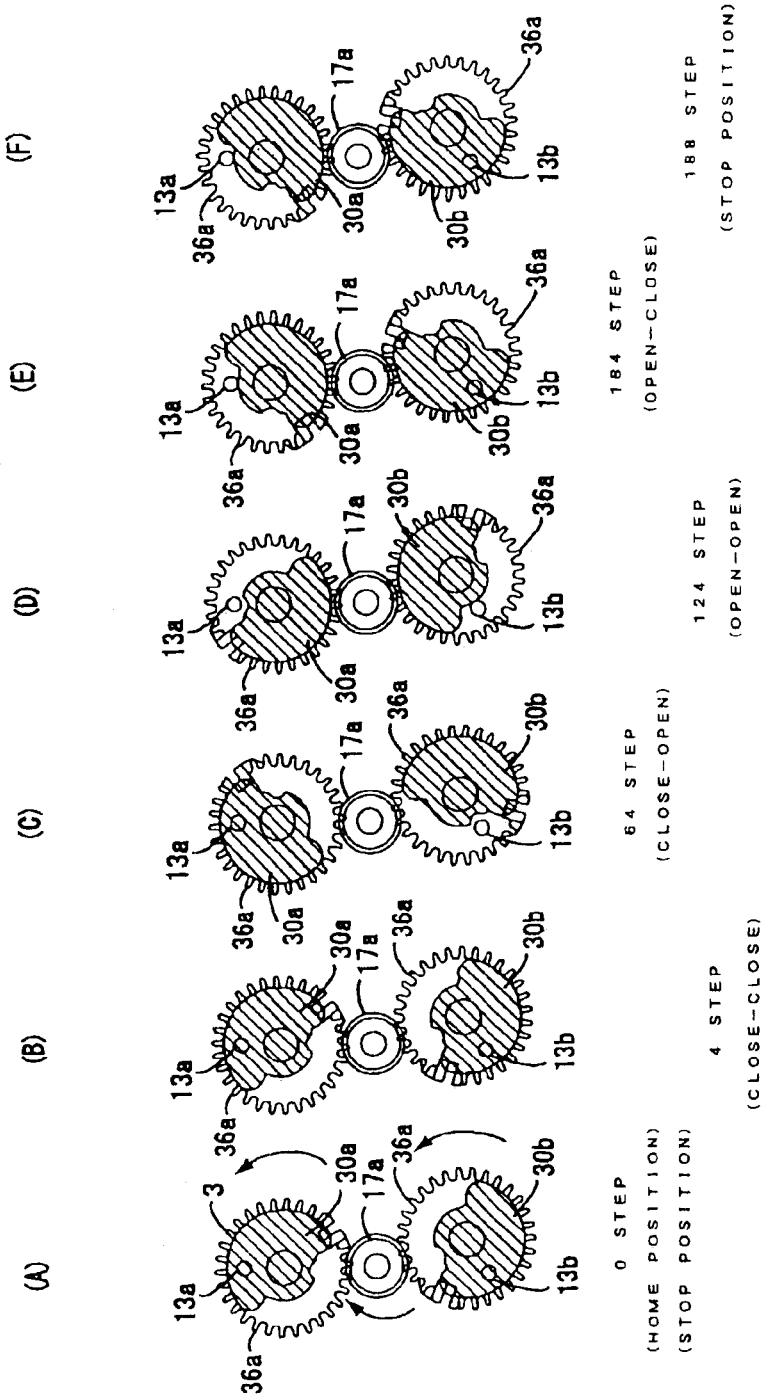

TEMPERATURE CONTROL METHOD FOR REFRIGERATOR

BACKGROUND OF THE INVENTION

1. Field of the Invention

The present invention relates to a temperature control method for a refrigerator, which is constituted to distribute a common refrigerant to a plurality of chambers for cooling each chamber.

2. Description of Related Art

In a valve device which distributes a common refrigerant to a plurality of chambers for cooling the respective chambers in a refrigerator, as shown in FIG. 5 (A), in general, an inflow port (not shown), where the refrigerant flows into, and a first outflow port 13a and a second outflow port 13b, where the refrigerant flows out, are positioned in a sealed space. The two planar valve elements 30a and 30b are arranged in the same sealed space. The two planar valve elements 30a and 30b are respectively formed with gears 36a and 36b in an integral manner, and a pinion 17a integrally rotating with the rotor of a stepping motor is engaged with the respective gears 36a and 36b.

Therefore, when the stepping motor is driven, the rotation of the motor is transmitted to the valve elements 30a and 30b through the pinion 17a and the gears 36a and 36b. Here, a mode where the first outflow port 13a is in a closed state and the second outflow port 13b is in a closed state is referred to as a CLOSE-CLOSE mode, a mode where the first outflow port 13a is in a closed state and the second outflow port 13b is in an open state is referred to as a CLOSE-OPEN mode, a mode where both of the first outflow port 13a and the second outflow port 13b are in an open state is referred to as an OPEN-OPEN mode, and a mode where the first outflow port 13a is in an open state and the second outflow port 13b is in a closed state is referred to as an OPEN-CLOSE mode. By means of controlling angular positions of the valve elements 30a and 30b, HOME position in a CLOSE-CLOSE state shown in FIG. 5(A), the CLOSE-CLOSE mode shown in FIG. 5(B), the CLOSE-OPEN mode shown in FIG. 5 (C), the OPEN-OPEN mode shown in FIG. 5(D), the OPEN-CLOSE mode shown in FIG. 5(E), and a stop position in an OPEN-CLOSE state shown in FIG. 5(F) are respectively obtained in this order.

In the conventional refrigerator, after a power source is turned on, it is controlled that the OPEN-OPEN mode is set for supplying a refrigerant from the first outflow port 13a to a first chamber and from the second outflow port 13b to a second chamber. After the first chamber and the second chamber have been cooled to a prescribed temperature, the respective temperatures in the first chamber and the second chamber are independently controlled in accordance with the mode to be selected.

However, in the conventional refrigerator, when the power source is turned on, the first chamber and the second chamber are cooled by setting in the OPEN-OPEN mode. In this case, there is a problem that cooling rates are often largely different from each other in the first and the second chambers as shown in FIG. 4(B). In the drawing, temperature changes in the first chamber and the second chamber are respectively shown as the lines of L11 and L12. Consequently, when foods are stored in a cold state or in a frozen state, there is a problem that the temperature difference in the first chamber or the second chamber becomes large, which causes dispersion in quality.

To prevent the above-mentioned problem, a countermeasure has been adopted in which the diameters of the first outflow port 13a and the second outflow port 13b are formed in the same dimension with high precision. However, the cooling rates in the first chamber and the second chamber do not become the same.

The reason may be that, even when the diameters of the first outflow port 13a and the second outflow port 13b have the same dimension, the mounting posture of the refrigerant distributing device to the refrigerator, or the like, causes the flow rate of the refrigerant vary. In other words, when a fluorocarbon or an alternative fluorocarbon is used, 95% or more of the refrigerant, which flows in from the inflow port, changes into gas due to a tube expansion-or the like, while the liquid spreads on a wall surface from the inflow port to the outflow port on a wall surface from the inflow port to the outflow port. Therefore, the variation of the distance from the inflow port to the outflow port or the variation of the position of the outflow port causes to vary the flow amount of the refrigerant.

Consequently, an experimental result was obtained that, after a power source has been turned on, for example, even when the cooling rate in a first chamber is higher than that in a second chamber, the cooling rate in the second chamber can become higher as shown in FIG. 4(B) by changing the posture of the refrigerant distribution device. Furthermore, the mounting posture of a valve device is generally different for every refrigerator manufactured. Therefore, it is extremely difficult to produce a balance of the cooling rates in every refrigerator.

SUMMARY OF THE INVENTION

In view of the problems described above, it is an advantage of the present invention to provide a temperature control method, which is capable of setting cooling rates in respective chambers to be generally the same directly after a power source is turned on in a refrigerator constituted in such a manner that a common refrigerant is distributed to a plurality of chambers for cooling the respective chambers.

In order to achieve the above advantage, according to the present invention, there is provided a temperature control method for a refrigerator including a valve device, in which an inflow port where a refrigerant flows into, at least two outflow ports having a first outflow port and a second outflow port where the refrigerant flows out, and a valve element for performing opening/closing of the outflow ports are positioned in a sealed space, and a valve element drive device for driving the valve element. The valve element drive device is controlled, at the time a power source of the refrigerator is turned on, so as to reciprocate between a first mode on an OPEN-CLOSE mode side where the first outflow port is in an open state and the second outflow port is in a closed state, and a second mode on a CLOSE-OPEN mode side where the first outflow port is in a closed state and the second outflow port is in an open state, until a temperature in a first chamber where the refrigerant is supplied through the first outflow port, and a temperature in a second chamber where the refrigerant is supplied through the second outflow port, are lowered to reach to a prescribed temperature. Accordingly, the first chamber and the second chamber are cooled down with generally same cooling rates.

In accordance with an embodiment of the present invention, when the power source of the refrigerator is turned on, it is controlled that the first mode on the OPEN-CLOSE mode side and the second mode on the CLOSE-OPEN mode side are repeated until the temperature in a first chamber where the refrigerant is supplied through the first outflow port, and the temperature in a second chamber where the refrigerant is supplied through the second outflow port, are lowered to reach to prescribed temperatures. Therefore, the flow rates of the refrigerant are repeatedly varied and are not maintained constant as the conventional case, when both of the first outflow port and the second outflow port are maintained in an open state.

When the first mode on the OPEN-CLOSE mode side and the second mode on the CLOSE-OPEN mode side are controlled so as to reciprocate as described above, the flow rate of the refrigerant can be equalized to be supplied into the first chamber and the second chamber. This is mainly because the flow passages communicating with the first outflow port and the second outflow port are generally formed to be narrow and the flow rate of the refrigerant is more influenced by flow-resistance as toward the downstream side of the flow passage. As described above, the average outflow amount of the refrigerant in the first outflow port and the second outflow port can be generally equalized by controlling so as to reciprocate the valve element between the first mode and the second mode, and thus the cooling rates can be set generally in the same manner in the first chamber and the second chamber.

In accordance with an embodiment of the present invention, a separate distance between the first outflow port and the second outflow port is preferably set to be not more than 5 mm. In this case, the first outflow port and the second outflow port can be positioned at substantially equal distances from the inflow port and the variation is also reduced. Accordingly, the average flow amount of the refrigerant can be further more equalized in the first outflow port and the second outflow port.

Preferably, a CLOSE-CLOSE mode where both of the first outflow port and the second outflow port are in a closed state, is arranged at a portion other than the portion between the OPEN-CLOSE mode and the CLOSE-OPEN mode. In other words, in the present embodiment, the CLOSE-CLOSE mode is not provided between the OPEN-CLOSE mode and the CLOSE-OPEN mode. As constituted above, at the time the power source of the refrigerator is turned on, even though the valve element drive device is controlled so as to reciprocate the valve element between the first mode on the OPEN-CLOSE mode side and the second mode on the CLOSE-OPEN mode side until the temperatures in the first chamber and second chamber are lowered to reach to the prescribed temperatures, it is not required to pass the CLOSE-CLOSE mode because the CLOSE-CLOSE mode is not present between the OPEN-CLOSE mode and the CLOSE-OPEN mode. Consequently, a compressor is protected from over load.

In accordance with an embodiment of the present invention, the valve element drive device is controlled, after the power source of the refrigerator is turned on, so as to reciprocate the valve element between the OPEN-CLOSE mode and the CLOSE-OPEN mode, until the temperatures in the first and second chambers are lowered to reach to the prescribed temperatures.

In accordance with an embodiment of the present invention, the first mode on the OPEN-CLOSE mode side is a mode where the second outflow port is not only in a literal closed state but is also in a generally closed state or in a somewhat opened state, while the first outflow port is in a literal open state. In this case, similar effects can be attained when the second outflow port is shifted from the complete open state to the closed state side even if the closed state is not complete. Similarly, in the second mode on the CLOSE-OPEN mode side, similar effects can be attained when the first outflow port is not only in a literal closed state but is also in a generally closed state or in a somewhat opened state.

In another embodiment of the present invention, the valve element drive device is controlled, at the time a power source of the refrigerator is turned on, so as to reciprocate the valve element between a first state where a opening degree in the first outflow port is larger than that in the second outflow port, and a second state where the opening degree in the second outflow port is larger than that in the first outflow port, although in an OPEN-OPEN mode where both of the first outflow port and the second outflow port are in an open state, until a temperature in a first chamber and a temperature in a second chamber are lowered to reach to a prescribed temperature. Accordingly, the first chamber and the second chamber are cooled down with generally same cooling rates.

In order to control as described above, it is preferable to arrange the OPEN-OPEN mode between the OPEN-CLOSE mode and the CLOSE-OPEN mode. In this case, when it is controlled to move to the OPEN-CLOSE mode side from the OPEN-OPEN mode, the first state where the opening degree in the first outflow port is larger than that in the second outflow port can be easily obtained. In addition, when it is controlled to move to the CLOSE-OPEN mode side from the OPEN-OPEN mode, the second state where the opening degree in the second outflow port is larger than that in the first outflow port can be easily obtained.

In accordance with an embodiment of the present invention, when the state is changed, such as when the first outflow port and the second outflow port are respectively shifted from the open state to the closed state or vice versa, it is preferable to control the opening/closing by the valve element to be performed gradually. In this control method, rapidly varying of the flow rate of the refrigerant can be prevented. In addition, the pressure fluctuation in the flow passage is reduced and overload to other devices can be prevented.

In accordance with an embodiment of the present invention, when the state is changed, such as when the first outflow port and the second outflow port are respectively shifted from the open state to the closed state or vice versa, it is preferable to control the operation by providing a pause period for 5 to 10 seconds after the state has been changed. In this control method, since the pause period of excitation for the stator coil is ensured, heat generation in the motor can be prevented and power-saving can be attained.

In accordance with an embodiment of the present invention, when the state is changed, for example, when the OPEN-CLOSE mode is interchanged with the CLOSE-OPEN mode, it is preferable to control the ratio of the mode continuing periods so that the ratio is set corresponding to the ratio of the volume in the first chamber and the volume in the second chamber. Specifically, when the ratio of the volume in the first chamber and the volume in the second chamber is 1:2, the ratio of the open continuation time for the first chamber and the open continuation time for the second chamber is commonly set to be 1:2. However, a suitable ratio may be determined by consideration of various kinds of conditions and experiments.

Other features and advantages of the invention will become apparent from the following detailed description taken in conjunction with the accompanying drawings.

BRIEF DESCRIPTION OF DRAWINGS

FIG. 1 is a longitudinal sectional view of a refrigerant distribution device for a refrigerator in accordance with an embodiment of the present invention.

FIGS. 2(A) to (F) are explanatory views of respective modes of the refrigerant distribution device shown in FIG. 1.

FIG. 3 is an explanatory chart which shows timings for opening or closing respective outflow ports in the refrigerant distribution device shown in FIG. 1.

FIG. 4(A) is a graph which shows cooling rates in a first chamber and a second chamber of a refrigerator, which are cooled by using the refrigerant distribution device shown in FIG. 1. FIG. 4(B) is a graph which shows cooling rates in a first chamber and a second chamber of a refrigerator, which are cooled by using a conventional refrigerant distribution device.

FIGS. 5(A) to (F) are explanatory views of respective modes of the conventional refrigerant distribution device.

DETAILED DESCRIPTION OF THE PREFERRED EMBODIMENTS

A refrigerant distribution device for a refrigerator in accordance with an embodiment of the present invention will be described below with reference to the accompanying drawings.

FIG. 1 is a longitudinal sectional view of a refrigerant distribution device for a refrigerator in accordance with an embodiment of the present invention. FIGS. 2 (A) to (F) are explanatory views of respective modes of the refrigerant distribution device shown in FIG. 1. FIG. 3 is an explanatory chart which shows timings for opening or closing respective outflow ports in the refrigerant distribution device shown in FIG. 1. FIG. 4(A) is a graph which shows cooling rates in a first chamber and a second chamber of a refrigerator, which are cooled by using the refrigerant distribution device shown in FIG. 1.

In FIG. 1, a refrigerant distribution device 1 of the present embodiment includes a valve device 1a, which is constituted so as to be hermetically sealed with a valve seat plate 13 and a sealing case 14 tightly fitted on the valve seat plate 13. The valve seat plate 13 is formed by press working with a metal plate.

A stepping motor 10, which is a valve drive device for driving a valve element described later, is arranged in the inside and outside of the sealing case 14. In the stepping motor 10, a rotor 15 is arranged in the inside of the sealing case 14 and a stator 16 is arranged on an outer peripheral face of the sealing case 14. A lead-wire 16b connected to a fixed coil 16a is pulled out of the stator 16, and rotating or stopping of the rotor 15 is controlled by outputting a driving signal from a control section (not shown) provided with a microcomputer to the lead-wire 16b.

The rotor 15 is integrally formed with a magnet 15a on its outer peripheral side and a pinion 17 is formed at an end part of the rotor 15 on the side of the valve seat plate 13. The pinion 17 and the rotor 15 are rotatably supported to a rotor supporting shaft 18.

The lower end side of the sealing case 14 is enlarged to form a step portion for placing and positioning the stator 16. The bottom end part of the step portion of the sealing case 14 is fitted tightly with a step portion formed on an outer circumferential part of the valve seat plate 13.

In the valve device 1a, an inflow port 13c, which is in communication with an inflow pipe 28c to which a refrigerant is supplied, is opened on the surface on the sealing case 14 side of the valve seat plate 13. In a region of the opposite side of the inflow port 13c with respect to the pinion 17, a first outflow port 13a and a second outflow port 13b are opened, which are respectively in communication with a first outflow pipe 28a and a second outflow pipe 28b for feeding the refrigerant to respective chambers of the refrigerator (refer to FIG. 2(A)).

In this embodiment, a separate distance between the first outflow port 13a and the second outflow port 13b is set to be considerably short, for example, equal to or less than 5 mm, preferably 4 mm. In this constitution, the first outflow port 13a and the second outflow port 13b may be positioned at an approximately equal distance from the inflow port 13c. In addition, since the first outflow port 13a and the second outflow port 13b are located in extremely close proximity with respect to the inflow port 13c, the difference in position may be neglected. Therefore, an average outflow amount of the refrigerant in the first outflow port 13a and the second outflow port 13b can be further equalized.

A valve element supporting shaft 35 is disposed near the first outflow port 13a and the second outflow port 13b, and is provided with a valve element 30 integrally formed with a gear 36. In the present embodiment, the valve element 30 is used as a common valve element with respect to the first outflow port 13a and the second outflow port 13b.

Since the gear 36 is engaged with the pinion 17, the gear 36 is driven to rotate around the valve element supporting shaft 35 by the stepping motor 10. Accordingly, the valve element 30 is also driven and turned by the stepping motor 10.

Here, a mode, where the first outflow port 13a is in a closed state and the second outflow port 13b is in a closed state, is referred to as a CLOSE-CLOSE mode, a mode, where the first outflow port 13a is in a closed state and the second outflow port 13b is in an open state, is referred to as a CLOSE-OPEN mode, a mode, where both of the first outflow port 13a and the second outflow port 13b are in an open state, is referred to as an OPEN-OPEN mode, and a mode, where the first outflow port 13a is in an open state and the second outflow port 13b is in a closed state, is referred to as an OPEN-CLOSE mode. When an angle position of the valve element 30, which is respectively shown in slanted lines in FIG. 2, is controlled, a HOME position (0 step position in the stepping motor 10 engaged with a stopper) in a CLOSE-CLOSE state shown in FIG. 2(A), the CLOSE-CLOSE mode (34 step position) shown in FIG. 2(B), the CLOSE-OPEN mode (100 step position) shown in FIG. 2(C), the OPEN-OPEN mode (154 step position) shown in FIG. 2(D), the OPEN-CLOSE mode (195 step position) shown in FIG. 2(E), and a stop position (200 step position engaged with a stopper) in an OPEN-CLOSE state shown in FIG. 2(F) are respectively obtained in this order.

The first outflow port 13a and the second outflow port 13b are respectively formed in a circular shape. Therefore, when the first outflow port 13a and the second outflow port 13b are respectively shifted from an open state to a closed state, or from a closed state to an open state, opening/closing by the valve element 30 is gradually conducted as shown in FIG. 3. Even though the first outflow port 13a and the second outflow port 13b are not formed in a circular opening shape, the gradual opening/closing by the valve element 30 is performed in an easy manner.

In a refrigerator provided with the refrigerant distribution device 1 constituted as described above, the stepping motor 10 is controlled to be driven so as to reciprocate the valve element 30 between the OPEN-CLOSE mode and the CLOSE-OPEN mode after a power source of the refrigerator is turned on. The reciprocation by the stepping motor 10 is conducted until a temperature in a first chamber where a refrigerant is supplied from the first outflow port 13a through the first outflow pipe 28a and a temperature in a second chamber where the refrigerant is supplied from the second outflow port 13b through the second outflow pipe 28b are lowered to reach to a prescribed temperature, for example, to −35° C.

For example, the stepping motor 10 is driven so as to reciprocate between the OPEN-CLOSE mode and the CLOSE-OPEN mode after the power source of the refrigerator is turned on until the temperatures in the first chamber and the second chamber are lowered to reach to a prescribed temperature.

In this case, the first mode on the OPEN-CLOSE mode side is a mode where the second outflow port 13b is not only in a literal closed state but is also in a generally closed state or in a somewhat opened state, while the first outflow port 13a is in a literal open state. In other words, similar effects can be attained when the second outflow port 13b is shifted from the complete open state to the closed state side even if the closed state is not complete. Similarly, in the second mode on the CLOSE-OPEN mode side, similar effects can be attained when the first outflow port 13a is not only in a literal closed state but is also in a generally closed state or in a somewhat opened state, while the second outflow port 13b is in a literal open state.

Accordingly, when the stepping motor 10 is controlled to be driven so as to repeatedly move the valve element 30 between the CLOSE-OPEN mode side shown in FIG. 2(C) and the OPEN-CLOSE mode side shown in FIG. 2(E) through the OPEN-OPEN mode (154 step) shown in FIG. 2(D) as a center position, the first mode on the OPEN-CLOSE mode side and the second mode on the CLOSE-OPEN mode side are alternately obtained.

In this case, in order to obtain the closed state in the first outflow port 13a according to the embodiment of the present invention, for example, the stepping motor 10 may turn the valve element 30 at a required amount to close the first outflow port 13a without moving till the CLOSE-OPEN mode position shown in FIG. 2(C) from the OPEN-OPEN mode position shown in FIG. 2(D). In addition, as described above, the first outflow port 13a may be closed in such a manner like a literal closed state, a generally closed state or a somewhat opened state.

Similarly, in order to obtain the closed state in the second outflow port 13b, for example, the stepping motor 10 may turn the valve element 30 at a required amount in order to close the second outflow port 13b without moving till the OPEN-CLOSE mode position shown in FIG. 2(E) from the OPEN-OPEN mode position shown in FIG. 2(D). Also, the second outflow port 13b may be closed in a literal closed state, a generally closed state or a somewhat opened state.

Preferably, a pause period of 5 to 10 seconds is respectively provided after the first outflow port 13a and the second outflow port 13b are shifted from the open state to the closed state, or from the closed state to the open state. Such a pause period may serve to prevent the fixed coil 16a of the stepping motor 10 from generating heat.

In another embodiment of the present invention, the stepping motor 10 is preferably controlled to be driven so as to reciprocate the valve element 30 between two different OPEN-OPEN modes of the first outflow port 13a and the second outflow port 13b after a power source of a refrigerator is turned on until the temperatures in a first chamber and a second chamber are lowered to reach to a prescribed temperature. For example, the stepping motor 10 may be driven so as to reciprocate between a first OPEN-OPEN state where an opening degree of the first outflow port 13a is larger than an opening degree of the second outflow port 13b, and a second OPEN-OPEN state where an opening degree of the second outflow port 13b is larger than an opening degree of the first outflow port 13a. Specifically, the stepping motor 10 is controlled to be driven so as to reciprocate the valve element 30 between a first OPEN-OPEN state where an opening degree of the first outflow port 13a is 100% while an opening degree of the second outflow port 13b is 20%, and a second OPEN-OPEN state where an opening degree of the second outflow port 13b is 100% while an opening degree of the first outflow port 13a is 20%. In this embodiment, a pause period of 5 to 10 seconds is also preferably provided after the first outflow port 13a and the second outflow port 13b have been respectively shifted between the first OPEN-OPEN state and the second OPEN-OPEN state. Heat generation in the fixed coil 16a can be prevented by providing such a pause period.

When the first chamber and the second chamber are cooled by such a temperature control method, the flow rate of the refrigerant varies periodically. As a result, portions of a flow passage where flow-resistance is large, for example, the outflow pipes 28a and 28b, exhibit a buffer effect, and thus an average outflow amount of the refrigerant is equalized in the first outflow port 13a and the second outflow port 13b.

In the embodiment of the present invention, since the first outflow port 13a and the second outflow port 13b are located in extremely close proximity with respect to the inflow port 13c, the first outflow port 13a and the second outflow port 13b are positioned at an approximately equal distance from the inflow port 13c. Consequently, the difference in the positions can be neglected.

Therefore, the cooling rates can be generally the same in the first chamber and the second chamber as shown in FIG. 4(A), where the temperature changes in the first chamber and the second chamber are respectively shown as the lines of L1 and L2. Consequently, when food stored in a cold state or in a frozen state, the temperature difference in the first chamber or the second chamber is reduced to be capable of preventing quality dispersion.

In addition, in the above-mentioned embodiment, as shown in FIG. 2, the OPEN-OPEN mode is arranged between the OPEN-CLOSE mode and the CLOSE-OPEN mode, and the CLOSE-CLOSE mode is arranged other than the portion between the OPEN-CLOSE mode and the CLOSE-OPEN mode. Therefore, after the power source of the refrigerator is turned on, the CLOSE-CLOSE mode is not repeated even though the valve element drive device is controlled so as to reciprocate between the OPEN-CLOSE mode and the CLOSE-OPEN mode until the temperatures in the first chamber and second chamber are lowered to reach to the prescribed temperature. Consequently, a compressor is protected from being over loaded.

Also, in the above-mentioned embodiment, when the state is changed, such as when the first outflow port and the second outflow port are respectively shifted from the open state to the closed state or vice versa, the opening/closing by the valve element is performed gradually. Therefore, rapidly variation in the flow rate of the refrigerant can be prevented.

Furthermore, in the above-mentioned embodiment, when the state is changed, such as when the first outflow port 13a and the second outflow port 13b are respectively shifted from the open state to the closed state or vice versa, a pause period for 5 to 10 seconds is provide after the state has been changed. According to this control method, heat generation due to the excitation of the stator coil in the stepping motor 10 can be reduced.

When the volume of the first chamber and the volume of the second chamber are equal, the opening/closing operation in the first outflow port 13a and the second outflow port 13b is performed in general, during equal time intervals. However, when the volume of the first chamber is different from the volume of the second chamber, it is preferable to control the ratio of the mode continuing period of the OPEN-CLOSE mode and the CLOSE-OPEN mode so that the ratio is set corresponding to the ratio of the volume of the first chamber and the volume of the second chamber. For example, when the ratio of the volume of the first chamber and the volume of the second chamber is 1:2, the ratio of an open continuation time for the first chamber and an open continuation time for the second chamber is commonly set to be 1:2. However, a suitable ratio may be determined by consideration of various kinds of conditions and experiments.

Moreover, when three or more outflow ports are provided, it may be controlled so that each of the outflow ports is opened or closed so as to make the refrigerant flow periodically.

As described above, the temperature control method for a refrigerator according to the present invention is provided, after the power source of the refrigerator is turned on, the first mode on the OPEN-CLOSE mode side and the second mode on the CLOSE-OPEN mode side are repeated until the temperature in the first chamber where the refrigerant is supplied through the first outflow port, and the temperature in the second chamber where the refrigerant is supplied through the second outflow port, are lowered to reach to a prescribed temperature.

Therefore, the flow rates of the refrigerant are repeatedly varied and thus the average flow amount of the refrigerant can be equalized in the first outflow port and the second outflow port. Accordingly, the cooling rates can be set generally in the same manner in the first chamber and the second chamber.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A temperature control method for a refrigerator comprising:
    providing a valve device, in which an inflow port where a refrigerant flows into, at least two outflow ports having a first outflow port and a second outflow port where the refrigerant flows out, and a valve element for performing opening/closing of the outflow ports are positioned in a sealed space;
    providing a valve element drive device for driving the valve element; and
    controlling the valve element drive device, at the time a power source of the refrigerator is turned on, to reciprocate between a first mode on an OPEN-CLOSE mode side where the first outflow port is in an open state and the second outflow port is a closed state and a second mode on a CLOSE-OPEN mode side where the first outflow port is in a closed state and the second outflow port is in an open state until a temperature in a first chamber where the refrigerant is supplied through the first outflow port, and a temperature in a second chamber where the refrigerant is supplied through the second outflow port, are lowered to reach to a prescribed temperature.

2. The temperature control method for a refrigerator according to claim 1, further comprising separating the first outflow port and the second outflow port not more than 5 mm.

3. The temperature control method for a refrigerator according to claim 1, further comprising:
    defining the first mode as the OPEN-CLOSE mode where the first outflow port is in the open state and the second outflow port is in the closed state; and
    defining the second mode as the CLOSE-OPEN mode where the first outflow port is in the closed state and the second outflow port is in the open state.

4. The temperature control method for a refrigerator according to claim 1, further comprising arranging a CLOSE-CLOSE mode where both of the first outflow port and the second outflow port are in the closed state, except a position between the OPEN-CLOSE mode and the CLOSE-OPEN mode.

5. The temperature control method for a refrigerator according to claim 1, further comprising:
    defining the first mode as a mode where the first outflow port is in the open state and the second outflow port is in a nearly closed state; and
    defining the second mode as a mode where the first outflow port is in a nearly closed state and the second outflow port is in the open state.

6. The temperature control method for a refrigerator according to claim 1, further comprising:
    defining the first mode as a mode where the first outflow port is in the open state and the second outflow port is in a somewhat opened state; and
    defining the second mode as a mode where the first outflow port is in a somewhat opened state and the second outflow port is in the open state.

7. The temperature control method for a refrigerator according to claim 1, further comprising gradually performing the opening/closing of the first outflow port and the second outflow port by the valve element.

8. The temperature control method for a refrigerator according to claim 1, further comprising providing a pause period for 5 to 10 seconds after the modes of the first outflow port and the second outflow port have been changed.

9. The temperature control method for a refrigerator according to claim 1, further comprising:
    setting a ratio of a continuing period of the first mode and a continuing period of the second mode corresponding to a ratio of a volume of the first chamber and a volume of the second chamber in advance; and
    controlling the valve element drive device according to the continuing period of the first mode and the continuing period of the second mode.

10. A temperature control method for a refrigerator comprising:
    providing a valve device, in which an inflow port where a refrigerant flows into, at least two outflow ports having a first outflow port and a second outflow port where the refrigerant flows out, and a valve element for performing opening/closing of the outflow ports are positioned in a sealed space;

providing a valve element drive device for driving the valve element; and controlling the valve element drive device, at the time a power source of the refrigerator is turned on, to reciprocate between a first state on an OPEN-CLOSE mode where an opening degree of the first outflow port is larger than that of the second outflow port, and a second state on a CLOSE-OPEN mode where the opening degree of the second outflow port is larger than that of the first outflow port, in an OPEN-OPEN mode where both of the first outflow port and the second outflow port are in an open state, until the temperature in a first chamber and the temperature in a second chamber are lowered to reach a prescribed temperature.

11. The temperature control method for a refrigerator according to claim 10, further comprising:

arranging the OPEN-OPEN mode between an OPEN-CLOSE mode where the first outflow port is in an open state and the second outflow port is in a closed state, and the CLOSE-OPEN mode where the first outflow port is in a closed state and the second outflow port is in an open state.

12. The temperature control method for a refrigerator according to claim 10, further comprising gradually performing when the first state is changed to the second state and the second state is changed to the first state.

13. The temperature control method for a refrigerator according to claim 10, further comprising providing a pause period for 5 to 10 seconds after the first state is changed to the second state and the second state is changed to the first state.

14. The temperature control method for a refrigerator according to claim 10, further comprising:

setting a ratio of a continuing period of the first state and a continuing period of the second state corresponding to a ratio of a volume in the first chamber and a volume in the second chamber in advance, controlling the valve element drive device according to the continuing period of the first state and the continuing period of the second state.

15. A temperature control device for a refrigerator comprising:

a valve device, in which an inflow port where a refrigerant flows into, at least two outflow ports having a first outflow port and a second outflow port where the refrigerant flows out;

a valve element that performs opening/closing of the outflow ports are positioned in a sealed space; and a valve element drive device that drives the valve element and controlls the valve element drive device, at the time a power source of the refrigerator is turned on, to reciprocate between a first mode on an OPEN-CLOSE mode side where the first outflow port is in an open state and the second outflow port is in a closed state and a second mode on a CLOSE-OPEN mode side where the first outflow part is in a closed state and the second outflow port is in an open state until a temperature in a first chamber where the refrigerant is supplied through the first outflow port, and a temperature in a second chamber where the refrigerant is supplied through the second outflow port, are lowered to reach to a prescribed temperature.

16. The temperature control device for a refrigerator according to claim 15, wherein a separate distance between the first outflow port and the second outflow port is set to be not more than 5 mm.

17. The temperature control device for a refrigerator according to claim 15, wherein the first mode is the OPEN-CLOSE mode where the first outflow port is in the open state and the second outflow port is in the closed state, and the second mode is the CLOSE-OPEN mode where the first outflow port is in the closed state and the second outflow port is in the open state.

18. The temperature control device for a refrigerator according to claim 15, wherein the first mode is a mode where the first outflow port is in the open state and the second outflow port is in a nearly closed state, and the second mode is a mode where the first outflow port is in a nearly closed state and the second outflow port is in the open state.

19. The temperature control device for a refrigerator according to claim 15, wherein the first mode is a mode where the first outflow port is in the open state and the second outflow port is in a somewhat opened state, and the second mode is a mode where the first outflow port is in a somewhat opened state and the second outflow port is in the open state.

20. The temperature control device for a refrigerator according to claim 15, wherein the valve element gradually performs the opening/closing of the first outflow port and the second outflow port.

21. The temperature control method for a refrigerator according to claim 1, the method further comprising providing a pause period after the first mode is repeatedly changed to the second mode and after the second mode is repeatedly changed to the first mode.

22. The temperature control method for a refrigerator according to claim 10, the method further comprising providing a pause period after the first state is repeatedly changed to the second state and after the second state is repeatedly changed to the first state.

* * * * *